June 1, 1965  H. W. CLAUSS  3,186,139
PACKAGING OF MATERIAL IN POCKETS FORMED BETWEEN TAPE STRIPS
Filed May 26, 1961  6 Sheets-Sheet 1

INVENTOR
Harry W. Clauss
BY
ATTORNEYS

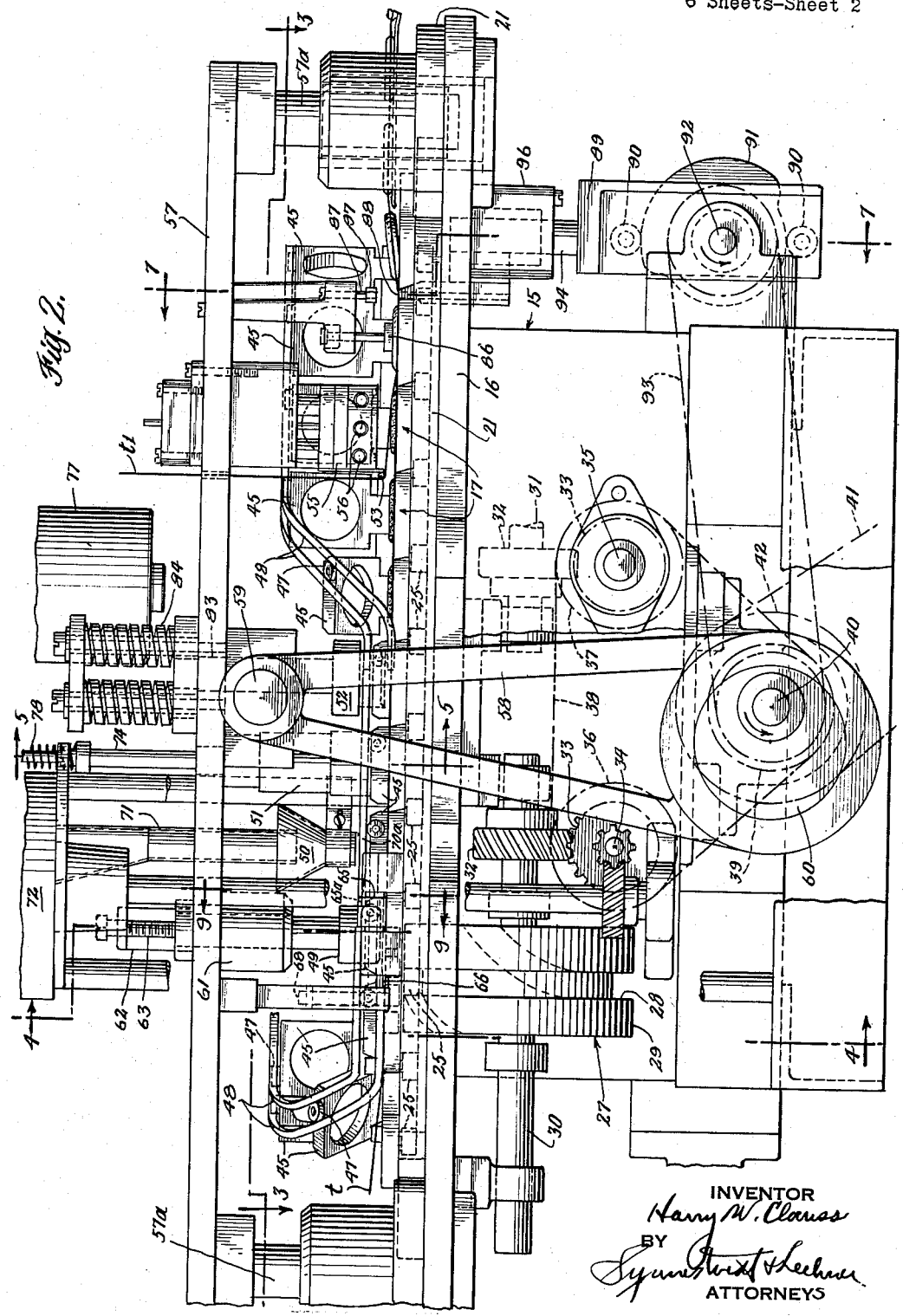

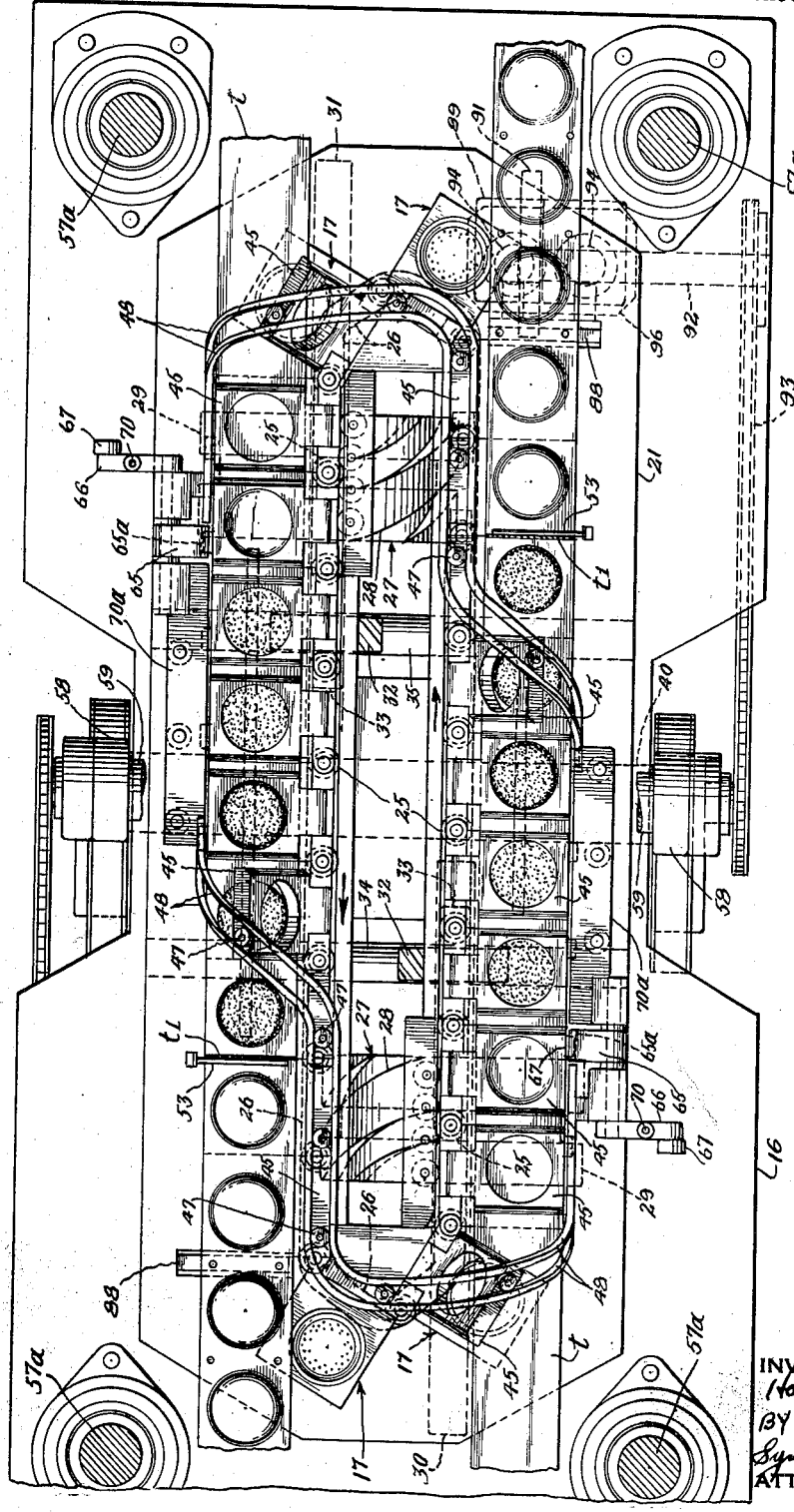

June 1, 1965  H. W. CLAUSS  3,186,139
PACKAGING OF MATERIAL IN POCKETS FORMED BETWEEN TAPE STRIPS
Filed May 26, 1961  6 Sheets-Sheet 4
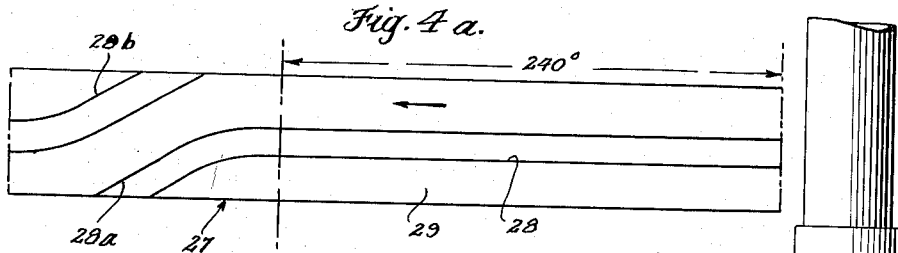
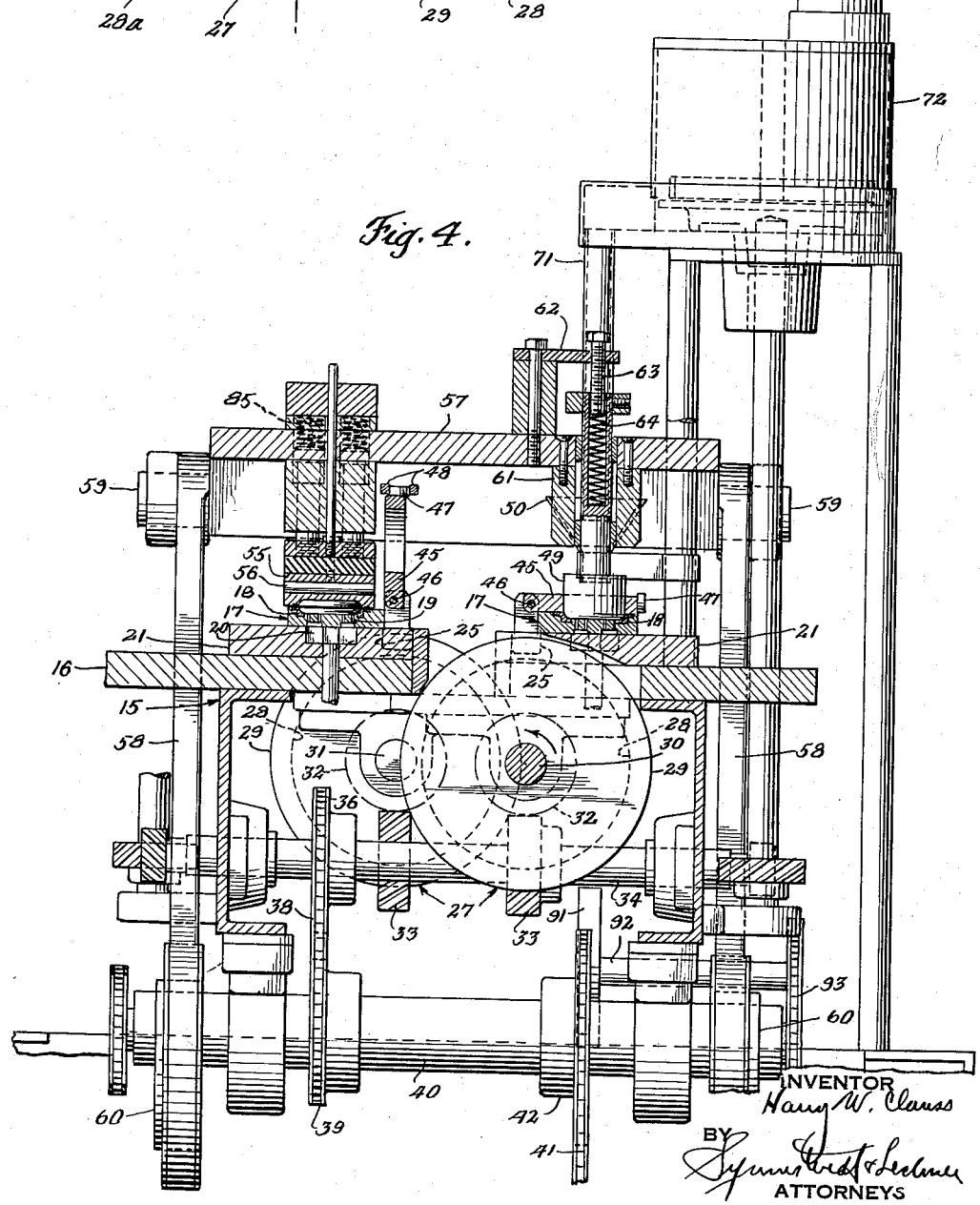
INVENTOR
Harry W. Clauss
BY
ATTORNEYS June 1, 1965  H. W. CLAUSS  3,186,139
PACKAGING OF MATERIAL IN POCKETS FORMED BETWEEN TAPE STRIPS
Filed May 26, 1961  6 Sheets-Sheet 5

INVENTOR
Harry W. Clauss
BY
ATTORNEYS

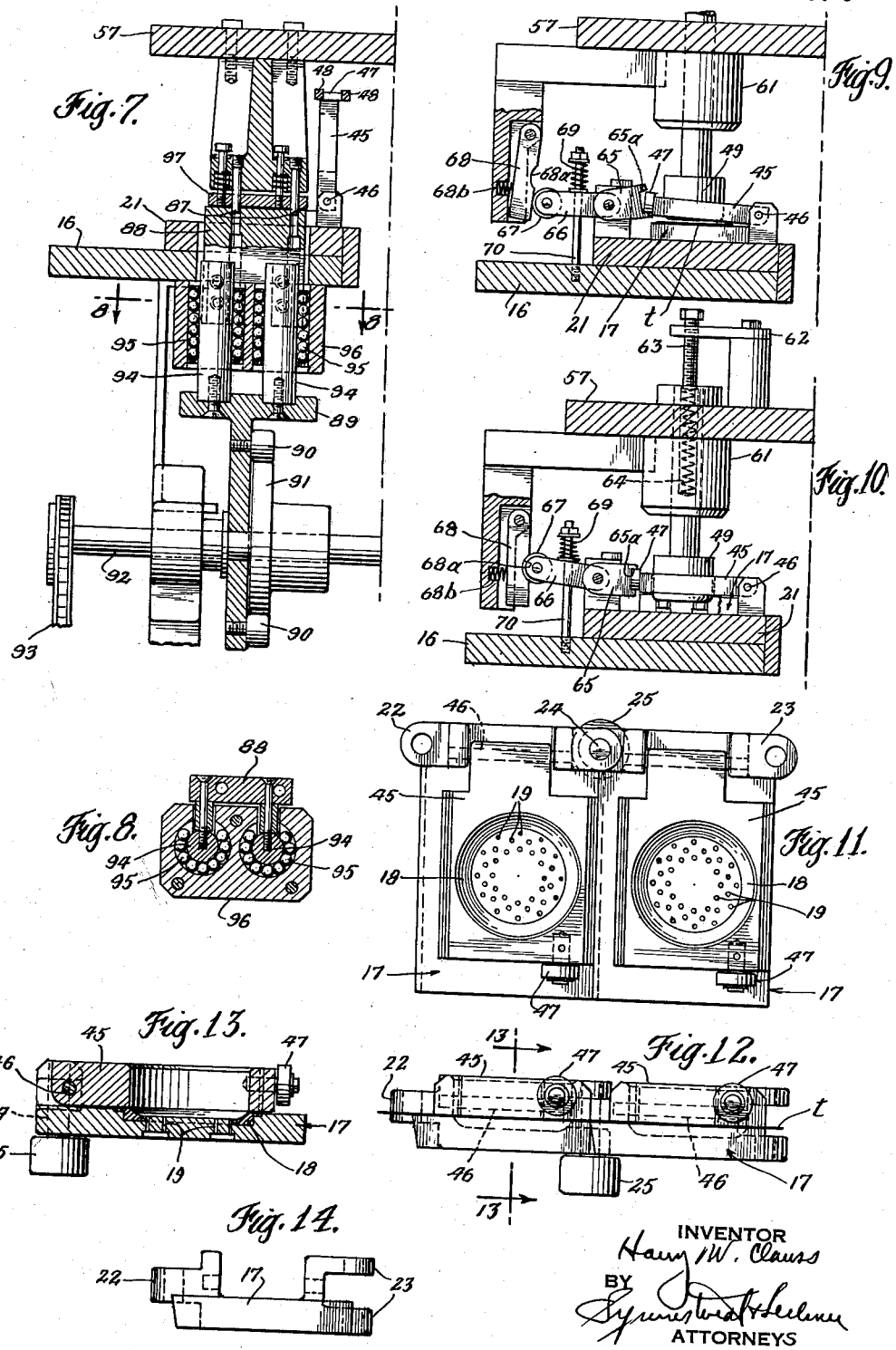

United States Patent Office 3,186,139
Patented June 1, 1965

3,186,139
PACKAGING OF MATERIAL IN POCKETS
FORMED BETWEEN TAPE STRIPS
Harry W. Clauss, Warminster, Pa., assignor to Rudd-Melikian, Inc., Hatboro, Pa., a corporation of Pennsylvania
Filed May 26, 1961, Ser. No. 112,893
11 Claims. (Cl. 53—124)

This invention relates to the packaging of materials in pockets or pods formed between sheet packaging material, such as tape strips. Although various features of the invention are of wide applicability in the general field referred to, the invention is particularly useful in the handling and packaging of powdered or granular materials, for instance coffee.

One of the principal objects of the invention is the provision of equipment for reliable and high speed production of coffee packages of the type adapted for use in coffee dispensing machines, in which individual packages or pods of coffee are sequentially employed for the brewing of individual cups of coffee. In certain coffee dispensing machines of this general type, the machines are adapted to handle and use a tape form of coffee package, i.e., a strip or tape for a series of spaced pods of coffee which are successively brought into the coffee brewing station in the dispensing machine. The invention is especially adapted to the high speed production of tapes of the type referred to having spaced pockets or pods of coffee formed therein.

Another object of the invention is the provision, in a packaging machine of the character referred to, of a plurality of tape supporting or forming devices which are mounted for movement in a closed circuit, preferably having two oppositely moving runs both located substantially in a common horizontal plane, with the tape forming or supporting surfaces presented upwardly. In this way, provision is made for utilizing the tape supporting or forming devices for packaging purposes in both of said oppositely moving runs of the closed circuit, thereby increasing the production capacity of the equipment.

The foregoing is accomplished according to the present invention by the employment of a series of plate-like tape supporting devices which are interconnected or interlinked in the manner of a continuous conveyor or chain, and the provision of two series of mechanisms for effecting the packaging, preferably including in each series a mechanism for initially forming a dimple in a tape strip, mechanism for feeding a measured charge of powdered or granular material to be packaged to said dimple, mechanism for leveling the charge, mechanism for briquetting or compressing the charge, mechanism for feeding a second tape strip over the first, mechanism for sealing the two strips of tape together around the briquette in the pocket, and mechanism for applying index markings to the package strip being formed, for instance punched holes, by means of which the feed and positioning of the package strip may be effected in a machine for subsequently handling and using the package strip.

In accordance with another aspect of the invention, provision is made for stepwise advance of the several tape supporting or tape forming devices from one operating station to the next in each of the two oppositely moving runs of the closed circuit, together with provision for accurate indexing or positioning of the several tape supporting plates in the operating stations, so that the mechanisms which cooperate therewith in the various stations will accurately register with the tape supporting plates.

How the foregoing, together with other objects and advantages are attained, will appear more fully from the following description taken with the accompanying drawings which illustrate a preferred embodiment of the invention and in which—

FIGURE 1 is a general side elevational view of a machine constructed in accordance with the present invention, the machine being of the press type incorporating an eccentric or cam device for reciprocating certain parts of the operating mechanisms; this machine being adapted for the production of a package tape containing spaced pods or pockets of granular or powdered material, such as coffee;

FIGURE 2 is an enlarged fragmentary side elevational view of portions of the equipment shown in FIGURE 1, with the eccentric rotated 90° counterclockwise from the position of FIGURE 1;

FIGURE 3 is a plan section taken approximately on the line 3—3 of FIGURE 2, looking down on the two runs of the tape supporting or forming devices, the view also omitting the operating mechanisms which are located above the two runs of the forming devices;

FIGURE 4 is a vertical cross section taken approximately on the line 4—4 of FIGURE 2;

FIGURE 4a is a development of the front indexing cam for effecting the stepwise movement of the tape forming devices in the front run thereof;

FIGURE 7 is a front-half vertical section taken approximately on the line 7—7 of FIGURE 2;

FIGURE 8 is a horizontal section of certain details taken substantially as indicated by the line 8—8 on FIGURE 7;

FIGURE 9 is a front-half vertical section taken approximately on the line 9—9 of FIGURE 2;

FIGURE 10 is a view similar to FIGURE 9 but illustrating the parts in a different position;

FIGURE 11 is a plan view to an enlarged scale of a pair of tape supporting or forming plates, with certain interconnecting and mounting devices associated therewith;

FIGURE 12 is an edge elevational view of the devices shown in FIGURE 11;

FIGURE 13 is a transverse sectional view taken as indicated by the line 13—13 on FIGURE 12; and FIGURE 14 is a front view of one of the tape forming plates seen in FIGURES 11, 12, and 13.

Figure 5:
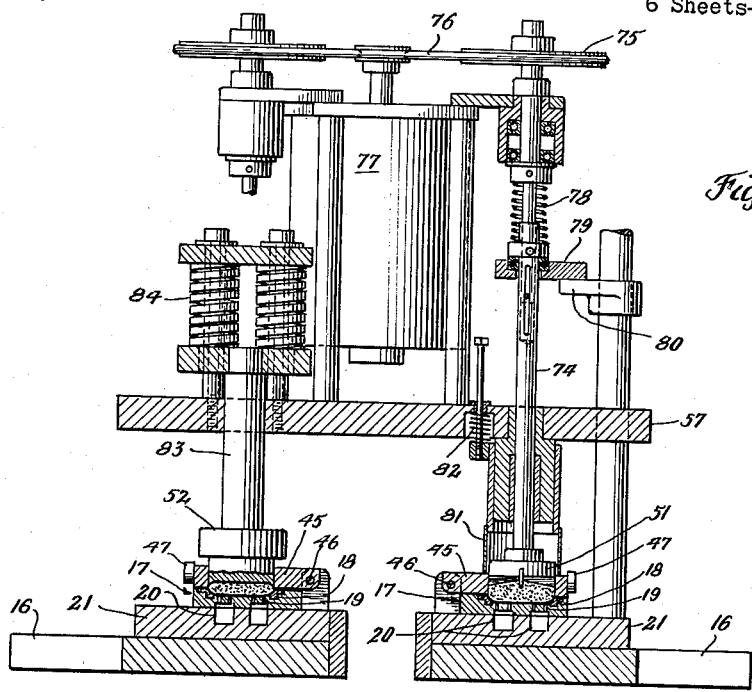
FIGURE 5 is a vertical cross section taken approximately on the line 5—5 of FIGURE 2.

As above mentioned, various features of the invention are of general applicability in the packaging art, but by way of example, the invention is herein illustrated and described as embodied in a machine for producing a "coffee tape" i.e., a package tape in which granular or powdered coffee is contained in a series of spaced pods or pockets lengthwise of the tape being produced. Certain general arrangements of the machine appear in FIGURE 1, from which it will be seen that the machine is of press type having a platen structure 15 on which is mounted a base plate 16 for supporting the tape forming devices hereinabove mentioned in their path of travel through the closed circuit referred to. These devices comprise a plate 17, two of which are shown in plan in FIGURE 11, and certain details of which are also shown in FIGURES 12, 13, and 14. Each plate is provided with a recess in its upper surface preferably having an annular liner 18 therein, which liner is desirably formed of resin material having a relatively high softening or melting point, such as polytetrafluoroethylene. A certain specific purpose for making this liner 18 of a resin material will be mentioned more fully hereinafter.

The bottom wall of the recess in the plate 17 is also provided with ports 19 extending downwardly therethrough and adapted to register with vacuum passages 20 formed in the underlying supporting plate 21 (see FIGURE 5) when the tape forming devices 17 are in certain of the operating stations in their circuit of movement. These vacuum ports and passages serve to retain the tape drawn downwardly into the recesses in the tape forming plates during certain operations which are performed, as will later more fully appear.

The plates 17 have lugs 22 and opposed spaced ears 23, these parts being adapted to interfit from plate to plate, and the several plates being secured together by pivots or pins 24 which, in effect, constitute pintles of a chain structure. Each of the pintles 24 also carries a roller 25 located below the plate and constituting a driving element by which the chain or conveyor structure as a whole is advanced and also constituting an element engageable with a guiding surface defining the path of movement of the plates when they shift from one run of the closed circuit into the other run thereof. Such guiding surfaces appear in dotted lines at 26 in FIGURE 3, from which latter figure the swinging of the plates from one run of the closed circuit into the other run will also be understood.

The manner in which the plates are advanced from station to station can best be understood from FIGURES 2, 3, 4, and 4a. From FIGURES 3 and 4 it will be seen that there are two plate shifting or indexing cams, a development of one of which appears in FIGURE 4a. Each of these cams, which is indicated generally by the numeral 27, is of cylindrical or barrel form having a guide groove 28 formed in the cylindrical surface 29. This groove lies substantially in a plane perpendicular to the axis of rotation of the cam throughout approximately 240° of the circumference of the cam, as is indicated in FIGURE 4a. In the remaining 120° one end of the groove diverges toward one end of the cam as indicated at 28a, and the other end of the groove diverges toward the other end of the cam as indicated at 28b in FIGURE 4a. As will be seen in FIGURES 2, 3, and 4, the cams 27 are mounted on shafts 30 and 31 which position the cams so as to cause the cam groove 28 to engage the rollers 25 which are carried at the lower ends of the pins or pintles 24 interconnecting the tape forming plates together in conveyor form. With this arrangement, as the rollers 25 leave the curved surface 26 at the end of the closed circuit and enter one of the straight runs, the rollers sequentially enter the guide groove 28 of the cam 27 and the rotation of the cam advances the interconnected plates one step, which corresponds to the distance from station to station in the series of stations provided for performing the several packaging operations. The direction of travel of the interconnected plates is indicated in FIGURE 3 by the arrows in the central portion of the figure.

The cams 27 are rotated continuously, but the straight portion 28 of the roller guide establishes a period of dwell in the movement of the tape forming plates, this period of dwell corresponding to 240° of the rotation of the cam, and the interval of plate advancement corresponding to 240° of the rotation of the cam, and the interval of plate advancement corresponding to 120°, which represents the portion of the cam in which the guide groove diverges at 28a and 28b toward its ends. These end portions are arranged so as to "pick up" the next succeeding roller 25, as the guide groove discharges or delivers each of the rollers 25 in its turn. In this manner an intermittent or stepwise feed of the tape forming plates is provided. The cams 27, as seen in FIGURES 2 and 4, are driven by spiral gearings 32–33, the gears 33 being mounted on shafts 34 and 35. Shafts 34 and 35 are provided with sprockets 36 and 37 which are driven in common by a chain 38 which passes around a sprocket 39 mounted on the crank shaft 40. The crank shaft 40 constitutes the main actuating shaft of the press mechanism, and this shaft is driven by means of the power chain 41 through a sprocket 42.

Various other mechanisms are also driven from or actuated by the crank shaft 40, as will later appear.

From the foregoing it will be seen that the tape supporting plates are arranged and driven to travel in a closed circuit having two oppositely moving runs, both of which lie substantially in a common horizontal plane, and in both of which the recesses or cavities in the plates are presented upwardly for cooperation with the packaging tape and the various mechanisms for performing the packaging operations. As seen in FIGURE 1, for the front run of the forming plates (the run toward the viewer in FIGURES 1 and 2, and the run toward the bottom of FIGURE 3) there is a tape supply indicated at 43, the tape t being extended from that supply through a mechanism for regulating the tape feed, the tape passing from such mechanism over a guide roller 44, and thence to the right over the front run of the tape forming plates 17. This first tape strip is laid on the tape supporting and forming plates 17 as they come into the front run of the closed circuit.

Before analyzing the various mechanisms arranged at the several operating stations, attention is now called to the fact that each of the tape forming plates 17 (see especially FIGURES 11, 12, and 13) carries a retainer or retainer ring 45 which is pivoted to the plate by means of a pin 46 providing for upward and downward swinging movement of the retainer to various positions, as is seen in FIGURES 2 and 3. These retainer rings are each provided with a roller 47 which is adapted to ride between spaced track elements 48—48 which extend around certain portions of the closed circuit of travel of the conveyor chain. These guides are also specially shaped or curved so as to provide for lifting of the retainers 45 at certain points in the cycle of operations, as will be seen and will also be further described. For example, in FIGURES 2 and 3, it will be seen that in the traverse or travel of the plates 17 in the front run from left to right, at a point at about the middle of the front run, the rollers 47 enter the space between the guides 48 and progressively raise the retainers until they are in a substantially vertical position toward the right-hand end of the front run and are continued in that substantially vertical position until the plates move into the right-hand end (the initial position) of the rear run of the plates. Similarly, at about the middle of the rear run when the plates are moving from right to left, the rollers 47 are again picked up by guide elements 48 and the retainers are lifted and brought to the vertical position toward the end of the travel of the plates to the left and then are subsequently returned to the horizontal position again as the plates enter the left-hand end of the front run.

As will be seen particularly from FIGURES 1 and 2, the retainers 45 descend and rest upon the plates 17 just at the point where the tape strip t is fed to the front run of the plates. At the first operating station in the front run, which station is represented in the right-hand portion of FIGURE 4, a dimpling plunger 49 is brought down through the retainer ring 45 and operates to depress the tape strip t into the recess in the forming plate 17 then located at that station. At that time, as will be seen from FIGURE 4, the vacuum ports 19 in the bottom of the recess of the forming plate have not yet come into registry with the vacuum passages 20 in the underlying base plate 21.

At the next station in the front run, coffee is delivered through the funnel 50 to the partly formed pod in the tape strip t. The succeeding operation performed at the next step, this being specifically illustrated in the right-hand portion of FIGURE 5, is the leveling of the charge of coffee previously deposited, by a leveling mechanism indicated at 51. Following this operation, when the forming plate is advanced to the next station, a compressing or briquetting plunger 52 (see also the left-hand portion of FIGURE 5) is brought down and compresses the charge of coffee within the retainer 45.

It is at this point in the cycle of operations that the track elements 48 engage the rollers 47 of the retainers 45 and start to lift the retainers away from the plates 17, as is plainly shown in FIGURES 2 and 3. This lifting occurs throughout a portion of the closed circuit of travel corresponding to two stations; and just beyond that point (see especially FIGURES 1 and 2), a second tape strip t–1 is fed to the apparatus so as to overlie the compressed briquets of coffee on the lower tape strip, this second tape strip being fed under a guide 53 and thence toward the right as clearly shown in FIGURES 1 and 2. The tape t–1 is supplied from a reel 54, as in the case of the first tape strip t passes through a feed control mechanism which need not be considered herein.

At the first station beyond the point of feed of the second tape strip t–1 a sealing head 55 is arranged and this head (see the left-hand portion of FIGURE 4) is provided with heating elements 56 and a cavity in its lower surface adapted to accommodate the briquet of coffee, so as to provide for pressing the two tape strips together around the periphery of the briquet and thereby effect sealing of the two tape strips to each other.

Although certain additional operating mechanisms are provided, the foregoing represent the principal packaging mechanisms which are employed for forming the pocket in the tape, for delivering the material to be packaged to the tape, for shaping and compressing the material to be packaged, and for completing the package pod. The mechanism just referred to, and also certain others, are all carried by a reciprocating portion of the press comprising a vertically movable plate structure 57 which is mounted for guided vertical movement by means of guide posts 57a (see FIGURES 1, 2 and 3). This vertically movable part of the press mechanism is actuated by means of the link or ram crank structure 58 which is pivoted to the plate 57 at 59 and which is mounted on the eccentric 60 which is carried by the crank shaft 40 hereinabove mentioned. It will be understood that a pair of ram cranks or links 58 are provided, one at each side of the apparatus, as will be seen from FIGURE 4.

Various of the operating mechanisms above referred to are mounted on and depend from the vertically movable plate 57, the mounting of the several devices being described just below.

First, as seen in FIGURE 4, with reference to the mounting of the dimpling plunger 49, note that this device is vertically movable in a guide 61, i.e., is vertically movable with respect to the plate 57. A bracket 62 carried by the plate 57 serves as a reaction point for the screw 63 by which pressure of the spring 64 may be varied, the spring serving to urge the dimpling plunger 49 downwardly with respect to the plate 57, but being caused to compress somewhat as the plate 57 reaches the lower end of its stroke.

Before considering the mounting of the other operating mechanisms on the vertically movable plate 57, attention is here directed to the fact that a special guide device is employed in the region of the first operating station, i.e., the station in which the dimpling plunger operates, in order to temporarily or momentarily lift the retainer 45 a short distance upwardly away from the tape strip t during the dimpling operation. The arrangement and operation of this guide device will be described with reference to FIGURES 2, 3, 9 and 10.

In FIGURE 2 the horizontal run of the track 48–48 to the left of the dimpling station is at a level such that the approaching retainer rings 45 are lifted upwardly away from the entering tape strip an amount such that the roller 47 of the ring 45 when located at the dimpling station will enter the receiving groove 65a of the guide lever 65 which at the time of operation of the dimpling plunger is in its raised position under the influence of the spring 69, the spring 69 acting against lever arm 66, together with lever arm 65, constitute a bell crank.

When the plate 57 moves downwardly to the position of FIGURE 9 the spring pressed latch 68 carried by the plate 57 engages the roller 67 of the lever 66 and continues to hold the lever 65 in raised position until the plate 57 has reached almost full dimpling position, thus enabling dimpling of the tape strip without danger of tearing the strip.

However, at this time, the roller 67 of lever 66 enters the notch 68a of press latch 68 with a sort of snap action to raise arm 66 and lower arm 65 and thereby to press the tape strip between the retainer ring 45 against tape strip on the plate 17, the spring 68b being of sufficient strength to prevent spring 69 from raising the lever 65.

When the dimpling plunger starts in its upward movement the dimpled tape strip is held in the pocket of the plate 17 because the notch 68a of the press latch 68 in its initial upward movement tends to move the arm 66 upwardly thus holding the lever 65 and retainer ring in holding position. Of course on continued upward movement of the dimpling plunger the press latch 68 leaves the roller 67 and the retainer ring again moves up to the position of FIGURE 9 under the influence of spring 69.

However, note from FIGURE 3 and from FIGURE 2 that upon the next stepwise or indexing movement of the tape forming devices the roller 47 of the approaching retainer ring 45 passes under a top guide plate 70a (FIGURES 2 and 3) thus pressing the approaching retainer ring 45 onto the tape strip. The guide plate 70a is extended lengthwise to the next section of the guide track 48—48.

Figure 6:
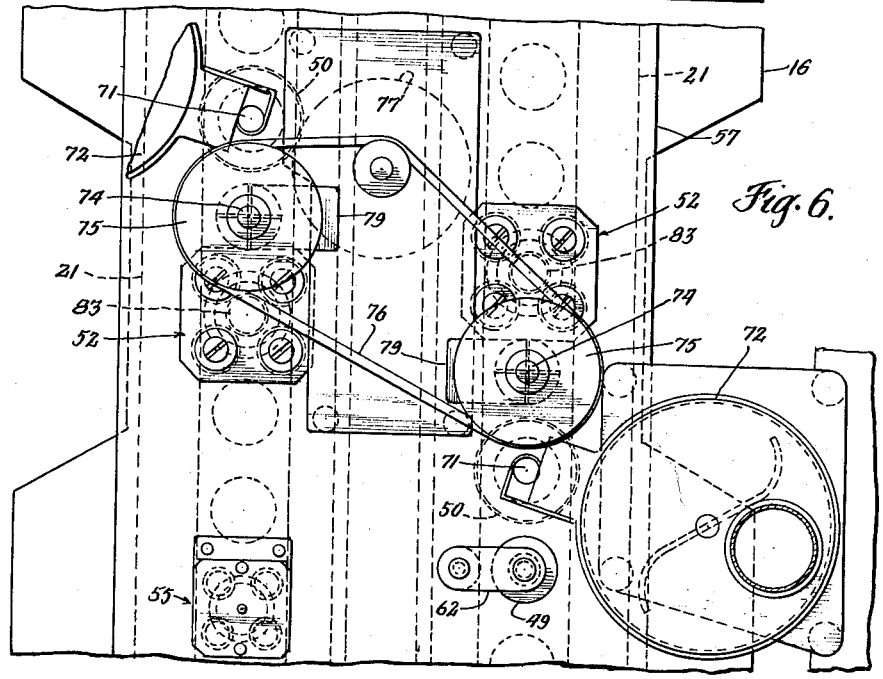
FIGURE 6 is a fragmentary plan view of various parts shown in FIGURE 5 and showing also a metering device for granular or powdered material to be fed to the apparatus.

Considering next the arrangement of the coffee feeding mechanism, coffee is delivered to the feed funnel 50 from the downwardly extending tube 71 which depends from a coffee feeding and measuring device 72 (see FIGURES 1 and 6). The details of this mechanism form no part of the present invention per se, and, therefore, need not be specifically discussed herein. Suffice it to say that at the second operating station a measured charge of coffee is delivered through the retainer 45 to the dimple formed in the tape. At this time, the vacuum ports 19 are in communication with the vacuum passages 20 (see FIGURE 5), so that the previously dimpled paper is retained in its pocketed condition to receive the coffee charge.

At the next station, as above already mentioned, the coffee charge is leveled by the leveling mechanism 51. This leveling mechanism, as will be seen from FIGURES 5 and 6, comprises a series of leveling blades carried at the lower end of a rotatable shaft 74 adapted to be driven by a pulley 75 and belt 76 from a motor 77. Shaft 74 is of a multi-part construction so as to provide freedom of movement of the lower part with respect to the upper, the lower part being yieldingly urged in a downward direction by a spring 78, which spring, upon engagement of the stop 79 which is fixed to the lower portion of the shaft 74 with the fixed stop 80 will compress and thus permit the stops 79 and 80 to establish an exact position of the leveling blades at the lower end of the press stroke. A shield 81 also carried by the vertically movable plate 57 and spring pressed by a spring 82 descends and engages the upper surface of the retainer ring 45 when the upper part of the press moves down.

At the next station in front run, the briquetting plunger 52 comes into operation. This plunger is also carried by the vertically movable plate 57 and has freedom for some vertical movement with respect to the plate 57 (see the left-hand portion of FIGURE 5 in which is illustrated the briquetting plunger for the rear run of the tape forming devices) because of the yielding action of the briquetting plunger shaft 83 with the plate 57 through the compression springs 84. The briquetting plunger operates through the retainer 45, and upon the lifting of the plunger and the next advance of the forming plates, the retaining rings are raised by the guide tracks 48 in the manner above-described and when they are in the vertical position two stations later in the travel the second tape strip *t–1* is fed to the apparatus just in advance of the sealing head 55. Here again the sealing head, as various of the other units, is yieldingly mounted on the vertically movable plate 57 by means of springs 85 which are illustrated in FIGURE 4. The action of these springs also provides an interval of dwell in the engagement of the sealing head with the tape strips, to thereby insure proper sealing action. At this point, attention is also called to the fact that the sealing head directly reacts against the polytetrafluoroethylene insert 18 provided in the forming plates 17. Preferably the sealing head has one or a few circumferential ridges positioned to press the tape strips against the resin insert 18, and the resin insert being somewhat yielding in character provides a more effective sealing action than would be the case were such a sealing head to react against a metal surface.

At the next station beyond the sealing device 55, a spring pressed hold-down plunger 86 is arranged, this plunger acting as an aid to proper positioning of the tape at this point which immediately precedes the punching operation which is performed between the next two stations in the path of travel in the circuit. Before considering the punch mechanism itself, attention is called to the fact that the hold-down plunger 86 is arranged at the last station preceding the curved or turning point at the end of the first run. This will be apparent from comparison of FIGURES 2 and 3. The turning of the plate 17 at this point away from the front run opens up a gap in the series of plates to make room for the punching operation to be performed. This punching operation is accomplished by a pair of punches 87—87 which are best seen in FIGURES 2 and 7, the punches cooperating with apertures in a die member 88, which is brought up to the underside of the tape by means of a bracket 89 vertically actuated by cam rollers 90 riding on a cam 91. This cam is carried by a shaft 92 connected with the main crank shaft 40 by a sprocket chain 93. As seen in FIGURE 8 die member 88 is carried by a pair of vertically movable shafts 94 mounted to move vertically in sets of bearing balls 95 mounted within the retainer mechanism 96.

The die member 88 serves not only as a punch die but further serves as an indexing or positioning element for the plate 17 in the front run of the circuit. Since the preceding plate 17 (see FIGURE 3) has swung away from the last plate in the front run, a space has been opened to permit the die member 88 to project upwardly at the end of the front run and thus provide an indexing or stop means for positioning the plates moving in the front run under the influence of the barrel cams 27 above-referred to.

Following actuation of punches 87, when the upper press plate 57 rises the spring plate stripper 97 serves to strip the tape from the punches and thus to free the tape for its continued stepwise motion out of the apparatus, in the right-hand direction when viewed as in FIGURES 2 and 3, for example.

All of the foregoing operating mechanisms are duplicated for the second run of the tape, although the sequence of the various devices for dimpling, charging, leveling, briquetting, sealing, and punching is inverted for the second run because of the fact that the second run of the forming devices moves in the opposite direction. However, these various operating devices for both runs of the forming devices are carried by the same vertically movable portion of the press mechanism, including the vertically movable plate 57.

According to the foregoing, an apparatus is provided for high-speed packaging operations and for rapid production of packages which, although they could be delivered separately from the apparatus, for instance by shearing them off as they are formed, can also, as in the specific apparatus described, be formed in a continuous package tape adapted for use for instance in a coffee dispensing machine.

The arrangement of the tape supporting or forming plates to travel in a stepwise manner in a closed circuit having two oppositely moving runs substantially in a common horizontal plane enables double use, so to speak, of various parts of the apparatus and thus effects increased overall production with a given number of forming plates.

I claim:

1. Apparatus for packaging material in pockets formed between tape strips comprising a plurality of tape supporting devices mounted for movement in a path from one operating station to another, means for feeding one tape strip to said devices in said path of movement, mechanism for delivering a compactible material to the tape strip, mechanism for briquetting said material on the tape at said one station, means for feeding a second tape strip to said devices in said path at a point beyond said one station, mechanism for sealing the tape strips together at said other station, and for each of said tape supporting devices a material retainer cooperating with the compactible material during briquetting at said one station, said retainer being connected with the tape supporting device to move therewith in said path but being displaceable out of its operating position to clear the second tape strip when the tape supporting device moves in its path from said one station to the other station.

2. A construction according to claim 1 and further including means operating by movement of the tape supporting devices from said one station to the other to displace the retainers out of their operating positions.

3. A construction according to claim 1 in which the retainers are pivotably connected with the tape supporting devices for pivotal displacement out of the operating position, and a guide track engageable with the retainers and positioned to pivot the retainers out of operating position when the tape supporting devices move from said one station to the other.

4. Apparatus for packaging material in pockets formed between tape strips comprising a plurality of tape supporting devices mounted for movement in a path from one operating station to another; means for feeding one tape strip to the forming devices in said path of movement, mechanism for delivering granular or powdered material to the tape strip at said one station, means for feeding a second tape strip to said devices in said path at a point beyond said one station, means for sealing the tape strips together at said other station, and for each of said tape supporting devices a material retainer cooperating with the granular or powdered material during delivery thereof to the tape, said retainer being connected with the tape supporting devices to move therewith in said path but being displaceable out of its operating position to clear the second tape strip when the tape supporting device moves in its path from said one station to the other station.

5. Apparatus for packaging material in pockets formed between tape strips comprising a plurality of tape supporting devices mounted for movement in a closed circuit including a plurality of packaging stations, means for feeding one tape strip to the forming devices in the region of said stations, mechanism for delivering a granular or powdered material to the tape strip at one of said stations, means for feeding a second tape strip to said devices at a point beyond the station at which the material is delivered to the first tape strip, for each of said tape supporting devices a material retainer cooperating with the granular or powdered material during the delivery thereof to the tape at said one station, said retainer being pivotally connected with the tape supporting devices for pivotal displacement out of operating position to clear the second tape strip when the tape supporting devices move from said one station past the point of feed of the second tape strip, and guide means engageable with the retainer and positioned to pivot the retainers out of operating position when the tape supporting devices move from said one station past the point of feed of the second tape strip and further positioned to pivot said retainers back into operating position at a point in said closed circuit in advance of said station at which the granular or powdered material is delivered to the tape.

6. Apparatus for packaging material in pockets formed between tape strips comprising a tape forming device having a recess therein, means for feeding a tape strip over said device, a dimpling element engageable with the tape over said recess and movable to depress the tape into said recess and thus form a dimple in the tape, mechanism for feeding material to be packaged to the dimple, a retainer overlying said device and acting to retain the material in the region of said dimple, and means for lifting the retainer during the dimpling operation.

7. Apparatus for packaging material in pockets formed between tape strips comprising a plurality of interconnected tape supporting plates arranged to travel in a closed circuit having a substantially straight run in which the plates are positioned edge-to-edge and further having a path curved edgewise of the plates at the delivery end of said straight run, in which construction a space is opened up between plates as they move from the straight run into said curved path, means for feeding tape to the plates in said straight run, reciprocable mechanisms adapted to cooperate with the plates in said straight run to perform packaging operations, and indexing means for the plates movable into said space between plates at the delivery end of the straight run.

8. Apparatus according to claim 7 in which the indexing means comprises an apertured element, and the apparatus further including a punch adapted to cooperate with an aperture in said element to punch a hole in the tape.

9. Apparatus for packaging material in pockets formed between tape strips comprising a plurality of tape supporting devices mounted to travel in a closed circuit including a run having a plurality of operating stations, means for feeding tape strip to the supporting devices in said run, mechanism for delivering charges of powdered or granular material to the tape, a reciprocable member cooperating with said run and a plurality of mechanisms for performing packaging operations at different ones of said stations mounted on said reciprocable member and including mechanism operating at one of said stations for leveling charges of material after delivery thereof to the tape, and mechanism also mounted on said reciprocable member for compressing the leveled charges at a station different from the one at which leveling is done.

10. Apparatus for packaging material in pockets formed between tape strips comprising a plurality of tape supporting devices mounted for movement in a closed circuit having two runs extending substantially in a common horizontal plane, said circuit including a plurality of packaging stations, means for each of said runs for feeding one tape strip to the forming devices in the region of said stations, mechanism for each of said runs for delivering a granular or powdered material to the tape strip at one of said stations, means for each of said runs for feeding a second tape strip to said devices at a point beyond the station at which the material is delivered to the first tape strip, for each of said tape supporting devices a material retainer cooperating with the granular or powdered material during the delivery thereof to the tape at said one station, said retainer being pivotally connected with the tape supporting devices for pivotal displacement out of operating position to clear the second tape strip when the tape supporting devices move from said one station past the point of feed of the second tape strip, and guide means engageable with the retainer and positioned to pivot the retainers out of operating position when the tape supporting devices move from said one station past the point of feed of the second tape strip and further positioned to pivot said retainers back into operating position at a point in said closed circuit in advance of said station at which the granular or powdered material is delivered to the tape, the guide means providing for two cycles of pivotal movement of said retainers, one for each of said tape runs.

11. Apparatus for packaging material in pockets formed between tape strips comprising a tape forming device having a recess therein, means for feeding a tape strip over said device, a dimpling element engageable with the tape over said recess and movable downwardly and upwardly to depress the tape strip into said recess and thus form a dimple in the tape and to release the dimpling element from engagement with the tape strip, a ring overlying said device around the recess therein and within which the dimpling element moves downwardly to depress the tape strip in the recess, means for holding said ring in engagement with the tape strip against the forming device when the dimpling element moves upwardly to thereby provide against lifting the tape strip from the forming device when the dimpling element moves upwardly, and means for lifting said ring from the tape strip on said device during downward movement of the dimpling element to depress the tape strip into the recess in the forming device.

References Cited by the Examiner

UNITED STATES PATENTS

| | | | |
|---|---|---|---|
| 1,895,899 | 1/33 | Schaub | 53—28 |
| 2,556,008 | 6/51 | Spalding. | |
| 2,603,927 | 7/52 | Grey. | |
| 2,615,200 | 10/52 | Cloud | 53—184 X |
| 2,746,223 | 5/56 | Fischer | 53—180 |
| 2,815,624 | 12/57 | Forry et al. | 53—184 |
| 2,916,864 | 12/59 | Meissner | 53—180 |
| 3,002,325 | 10/61 | Vogt | 53—184 X |
| 3,030,752 | 4/62 | De Woskin | 53—266 |
| 3,048,952 | 8/62 | Paal | 53—184 |

FRANK E. BAILEY, *Primary Examiner.*

ROBERT A. LEIGHEY, TRAVIS S. McGEHEE,
*Examiners.*